United States Patent
Cho et al.

(10) Patent No.: US 10,725,342 B2
(45) Date of Patent: Jul. 28, 2020

(54) LIQUID CRYSTAL DISPLAY DEVICE

(71) Applicant: LG Display Co., Ltd., Seoul (KR)

(72) Inventors: SungHyun Cho, Seoul (KR); SangWoon Kim, Gyeonggi-do (KR)

(73) Assignee: LG Display Co., Ltd., Seoul (KR)

(*) Notice: Subject to any disclaimer, the term of this patent is extended or adjusted under 35 U.S.C. 154(b) by 0 days.

(21) Appl. No.: 15/238,948

(22) Filed: Aug. 17, 2016

(65) Prior Publication Data
US 2017/0059906 A1    Mar. 2, 2017

(30) Foreign Application Priority Data
Aug. 31, 2015 (KR) .................. 10-2015-0122812

(51) Int. Cl.
*G02F 1/1339* (2006.01)

(52) U.S. Cl.
CPC ........ *G02F 1/1339* (2013.01); *G02F 1/13394* (2013.01); *G02F 2001/13396* (2013.01); *G02F 2001/13398* (2013.01)

(58) Field of Classification Search
CPC ........ G02F 2001/13396; G02F 1/1339; G02F 1/133723; G02F 1/13394; G02F 2001/13398
See application file for complete search history.

(56) References Cited

U.S. PATENT DOCUMENTS

| | | | |
|---|---|---|---|
| 6,018,380 A | 1/2000 | Hu et al. | |
| 6,650,393 B1 | 11/2003 | Nishiguchi | |
| 2002/0149730 A1 | 10/2002 | Jeong et al. | |
| 2004/0257504 A1 | 12/2004 | Kang et al. | |
| 2005/0001969 A1* | 1/2005 | Kim | G02F 1/1339 349/153 |
| 2007/0139603 A1* | 6/2007 | Saegusa | G02F 1/1339 349/155 |
| 2008/0116469 A1 | 5/2008 | Weng et al. | |
| 2011/0013131 A1 | 1/2011 | Tanaka et al. | |
| 2011/0058136 A1* | 3/2011 | Chang | G02F 1/13394 349/155 |

(Continued)

FOREIGN PATENT DOCUMENTS

| | | |
|---|---|---|
| CN | 1380634 A | 11/2002 |
| CN | 1538208 A | 10/2004 |

(Continued)

OTHER PUBLICATIONS

Extended European Search Report dated Jan. 25, 2017, for the corresponding European Patent Application No. 16179627.1.

(Continued)

*Primary Examiner* — Edmond C Lau
*Assistant Examiner* — Jonathan Y Jung
(74) *Attorney, Agent, or Firm* — Morgan, Lewis & Bockius LLP (57) ABSTRACT

A liquid crystal display device is provided. The liquid crystal display device includes a first substrate having elements configured to drive pixels; a second substrate having color filters corresponding to the pixels; and a sealant configured to bond the first substrate and the second substrate to each other. The first substrate includes a first protruding structure located in an area in contact with the sealant and the second substrate includes a second protruding structure located in an area in contact with the sealant.

17 Claims, 7 Drawing Sheets

(56) References Cited

U.S. PATENT DOCUMENTS

| | | | |
|---|---|---|---|
| 2012/0194772 A1* | 8/2012 | Moriwaki | G02F 1/1339 349/138 |
| 2012/0314178 A1 | 12/2012 | Doi et al. | |
| 2013/0063693 A1* | 3/2013 | Cheng | C09K 19/32 349/182 |
| 2013/0308084 A1* | 11/2013 | Niwano | G02F 1/1339 349/155 |
| 2014/0104548 A1 | 4/2014 | Yang et al. | |
| 2014/0347618 A1 | 11/2014 | Shirai | |
| 2015/0029432 A1* | 1/2015 | Ishikawa | G02F 1/13394 349/43 |
| 2015/0185539 A1 | 7/2015 | Senokuchi et al. | |
| 2015/0301370 A1* | 10/2015 | Moriwaki | G02F 1/1339 349/42 |
| 2016/0187684 A1* | 6/2016 | Zhang | G02F 1/134309 349/42 |
| 2016/0223848 A1 | 8/2016 | Wang | |

FOREIGN PATENT DOCUMENTS

| | | |
|---|---|---|
| CN | 101957519 A | 10/2004 |
| CN | 101706630 A | 5/2010 |
| CN | 102591048 A | 7/2012 |
| CN | 102819149 A | 12/2012 |
| CN | 102998867 A | 3/2013 |
| CN | 103728786 A | 4/2014 |
| CN | 104536211 A | 4/2015 |
| EP | 1235100 A2 | 8/2002 |
| JP | 2007-41215 A | 2/2007 |

OTHER PUBLICATIONS

Chinese Office Action dated Jan. 28, 2019, for the corresponding Chinese Patent Application No. 201610617674.5.
The Second Office Action dated Jun. 21, 2019, for the corresponding Chinese Patent Application No. 201610617674.5.

* cited by examiner

LIQUID CRYSTAL DISPLAY DEVICE

CROSS-REFERENCE TO RELATED APPLICATIONS

This application claims the priority of Korean Patent Application No. 10-2015-0122812 filed on Aug. 31, 2015, in the Korean Intellectual Property Office, the disclosure of which is incorporated herein by reference.

BACKGROUND

Field

The present disclosure relates to a liquid crystal display device and a structure thereof.

Description of the Related Art

A liquid crystal display device has a high contrast ratio and is suitable to display a moving image. Further, since power consumption of the liquid crystal display device is low, the liquid crystal display device is utilized in various fields such as a notebook computer, a monitor, or a TV. A molecular structure of a liquid crystal is thin and long. The liquid crystal has an optical anisotropy having a directivity of an alignment and a polarization property by which when the liquid crystal is located in an electric field, an orientation of the molecules changes depending on an intensity of the electric field. Therefore, the liquid crystal display device implements an image using the optical anisotropy and the polarization property of the liquid crystal.

Generally, a liquid crystal display device includes a liquid crystal panel formed by interposing a liquid crystal layer between two opposing substrates that are bonded to each other. Electrodes, formed on inner surfaces of two substrates, are used to change an orientation of the liquid crystal molecules by an electric field applied thereto, thereby causing difference of light transmittances. The difference of transmittances by the liquid crystal alignment is reflected to a color combination which is implemented while light supplied from a backlight passes through a color filter to be displayed as a color image.

A typical liquid crystal display device manufacturing process may be classified into a substrate manufacturing process for forming an array substrate and a color filter substrate, a cell process of completing a liquid crystal panel, and a module process of integrating the liquid crystal panel and the backlight.

During the process of completing a liquid crystal panel, a sealant is formed at an outer periphery of a substrate to bond the array substrate and the color filter substrate to each other. The sealant also serves to maintain a cell gap. Here, the present inventors recognized that the adhesion of the sealant between both substrates should be reinforced to increase stability and reliability of the liquid crystal panel.

SUMMARY

Accordingly, the present invention is directed to a liquid crystal display device that substantially obviates one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

An object of the present disclosure is to provide a liquid crystal display device. More specifically, an object of the present disclosure is to provide a structure which reinforces an adhesion of the sealant between both substrates. Further, another object of the present disclosure is to provide the above-mentioned structure through a simple process.

To achieve these and other advantages and in accordance with the purpose of the present invention, as embodied and broadly described, a liquid crystal display device comprises a first substrate having elements configured to driving pixels; a second substrate having color filters corresponding to the pixels; and a sealant configured to bond the first substrate and the second substrate to each other. Herein, the first substrate may include a first protruding structure located in an area in contact with the sealant, and the second substrate may include a second protruding structure located in an area in contact with the sealant.

In another aspect, a liquid crystal display device includes: a pair of substrates including an active area where images are displayed and an inactive area adjacent to or surrounding the active area; and a bonding member located between the pair of substrates, enclosing the active area in a partial area of the inactive area and bonding the pair of substrates to each other. Herein, the pair of substrates may have a structure configured to reinforce an adhesion of the bonding member with respect to the pair of substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

In describing components of the exemplary embodiment of the present disclosure, terminologies such as first, second, A, B, (a), (b), and the like may be used. The term is used to distinguish a component from the other component but a nature, an order, or the number of the components is not limited by the terminology. If it is described that a component is "connected" or "coupled" to another component, it is understood that the component is directly connected or coupled to the other component but another component may be "connected" or "coupled" between the components. When an element or layer is disposed "on" other element or layer, another layer or another element may be interposed directly on the other element or therebetween. A size and a thickness of each component illustrated in the drawing are illustrated for convenience of description, and the present disclosure is not limited to the size and the thickness of the component illustrated.

The features of various embodiments of the present disclosure can be partially or entirely bonded to or combined with each other and can be interlocked and operated in technically various ways by those skilled in the art, and the embodiments can be carried out independently of or in association with each other.

Hereinafter, various exemplary embodiments of the present disclosure will be described in detail with reference to accompanying drawings.

Figure 1:
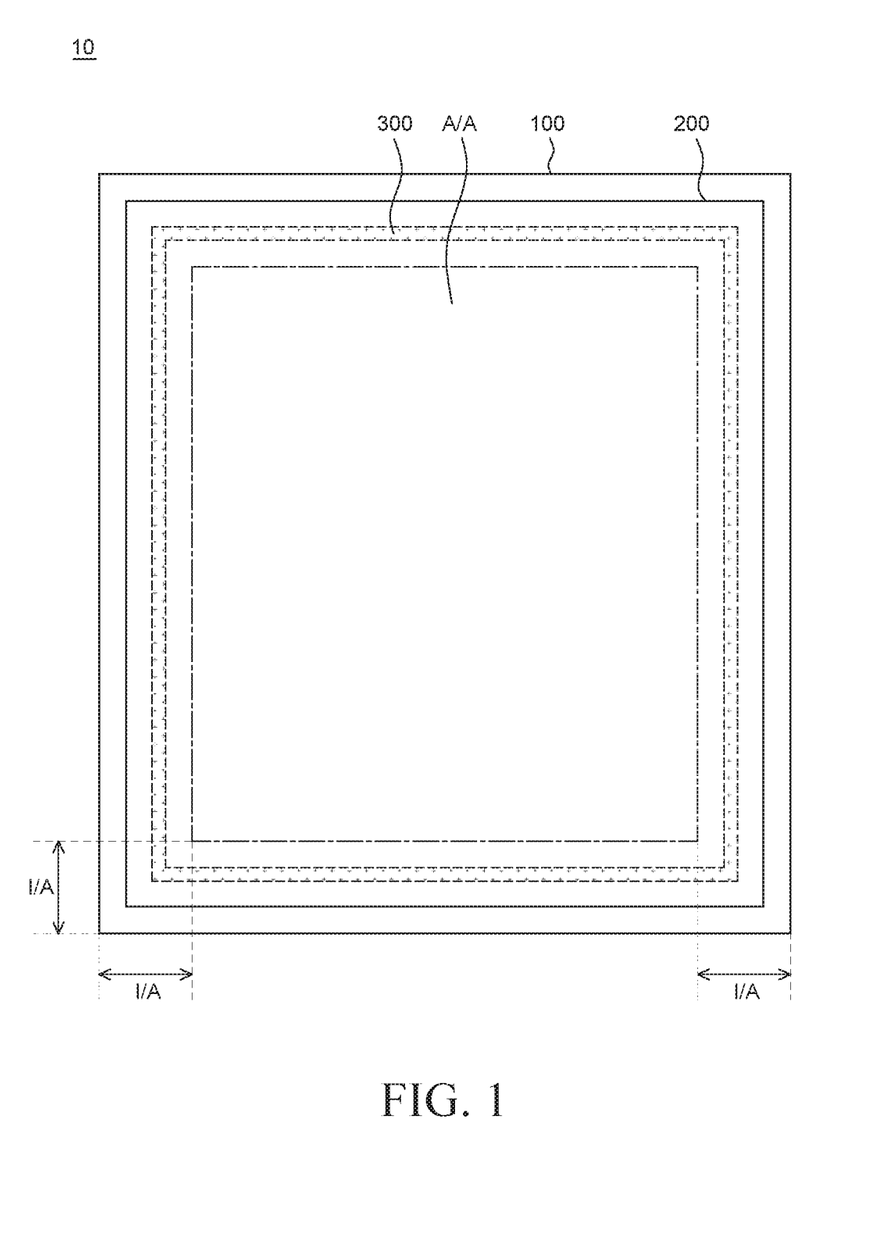
FIG. 1 is a schematically plane view of a display device according to an exemplary embodiment of the present disclosure.

FIG. 1 is a schematically plane view of a display device according to an exemplary embodiment of the present disclosure.

A liquid crystal display device will be described as an example of the above-mentioned display device. A liquid crystal display device 10 may include a thin film transistor (TFT) array substrate and a color filter substrate. A liquid crystal layer is interposed between the TFT array substrate and the color filter substrate.

There is an active area A/A where an image is displayed in a part of an area where the TFT array substrate 100 and the color filter substrate 200 are bonded to each other. In the active area, an array of pixels is disposed. One or more inactive areas I/A may be disposed around the active area. That is, the inactive area(s) I/A may be adjacent to one or more sides of the active area A/A. In FIG. 1, the inactive area encloses a quadrangular active area. However, a shape of the active area and a shape and an arrangement of the inactive area are not limited to an example illustrated in FIG. 1. The active area and the inactive area may have a shape suitable for a design of an electronic apparatus mounted with the display device 10. An exemplary shape of the active area is a pentagon, a hexagon, a circle, or an oval.

The inactive area I/A is located at the outside of the active area A/A. In the inactive area I/A, an interface unit, a plurality of wiring lines, or the like, is located. In the interface unit, a plurality of connecting interfaces (for example, a pad, a pin, or the like) which is connected to a wiring line extending to the active area is disposed.

Each pixel in the active area may be associated with a pixel circuit. The pixel circuit may include one or more transistors. Each pixel circuit may be electrically connected to a gate line and a data line in order to communicate with one or more driving circuits such as a gate driver and a data driver located in the inactive area.

The driving circuit may be implemented by a thin film transistor TFT in the inactive area. The driving circuit may be referred to as a gate-in-panel (GIP). Further, some components such as a data driver IC is mounted on a divided printed circuit board and is coupled to the connecting interface (a pad, a pin, or the like) disposed in the inactive area using a circuit film such as a flexible printed circuit board (FPCB), a chip-on-film (COF), or a tape-carrier-package (TCP). The printed circuit (COF, PCB, or the like) may be located at a rear side of the display device 10.

The display device 10 may include various additional elements to generate various signals and/or to drive the pixels in the active area. The additional element related to driving a pixel may include an inverter circuit, a multiplexer, or an electrostatic discharging circuit. The display device 10 may further include additional elements associated with functions other than driving a pixel. For example, the display device 10 may include additional elements which provide a touch sensing function, a user authentication function (for example, finger print recognition), a multilevel touch pressure sensing function, or a tactile feedback function. The above-mentioned additional elements may be located in an external circuit which is connected to the inactive area and/or the connecting interface.

Red, blue, and green color filters (or color refiners) can be disposed on a so-called color filter substrate corresponding to the active area.

A TFT array substrate and a color filter substrate may be implemented through processes such as thin film deposition, photo-lithography, or etching. Thereafter, a seal pattern to bond the TFT array substrate and the color filter substrate is formed on any one of the substrates and the two substrates are bonded to each other to interpose a liquid crystal layer therebetween, thereby forming a liquid crystal panel. After attaching a polarizer and/or a driving circuit onto the liquid crystal panel completed as described above, the liquid crystal panel is integrated with a backlight unit to form a liquid crystal display device.

In this case, as a sealant 300 which bonds the color filter substrate and the TFT array substrate, a thermosetting resin hardened by heating or an UV curable resin hardened by UV ray may be used. The UV curable resin may include a monomer including a photo initiator or an UV curing agent and glass fiber to maintain a cell gap. After applying the sealant on an edge of one or both substrates, when UV rays are radiated from a mercury UV lamp or a metal halide lamp after or while injecting liquid crystal between both substrates, the sealant is hardened to bond both substrates.

Figure 2:
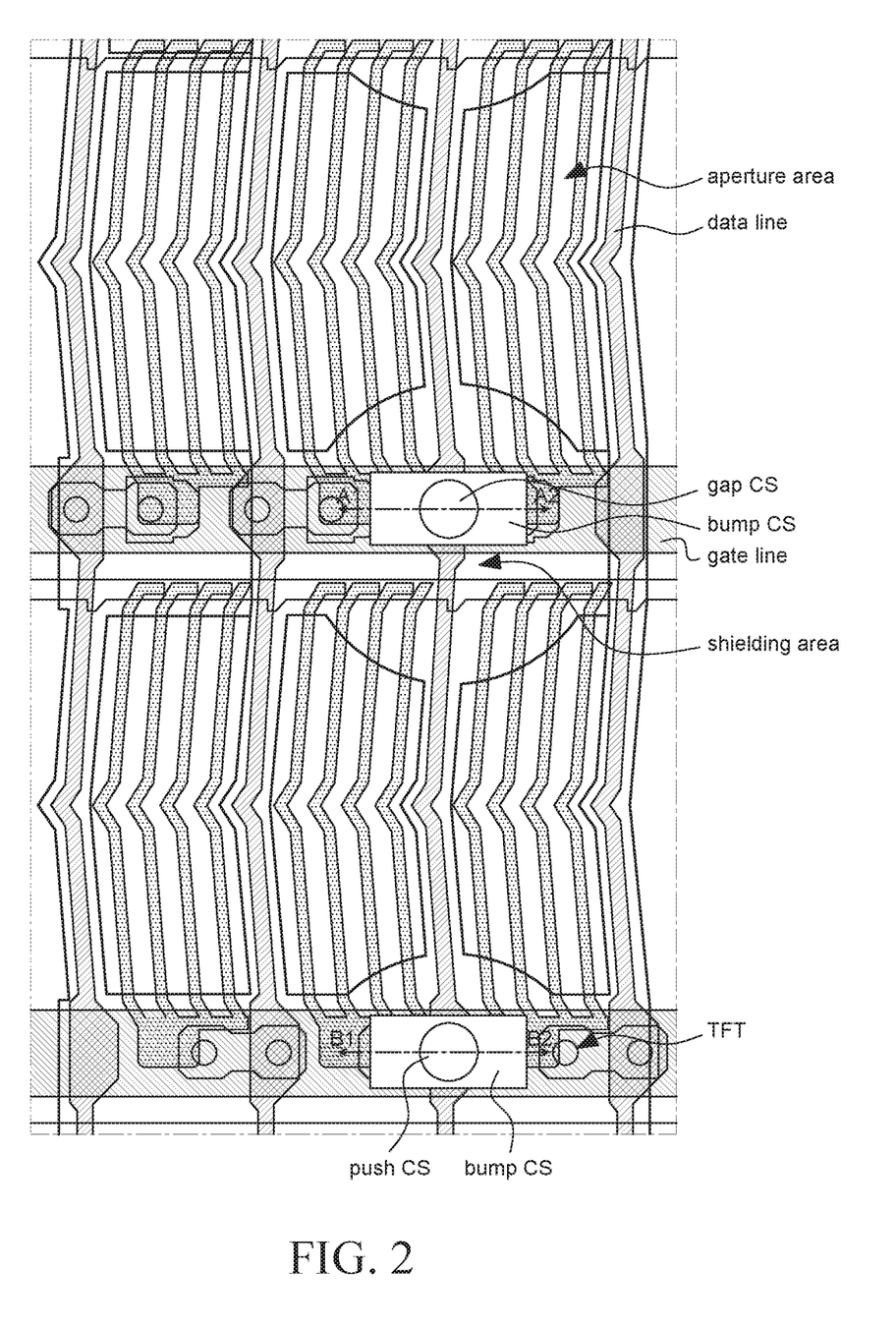
FIG. 2 is a plane view illustrating a part of an active area of a liquid crystal display device according to an exemplary embodiment of the present disclosure.
Figure 3:
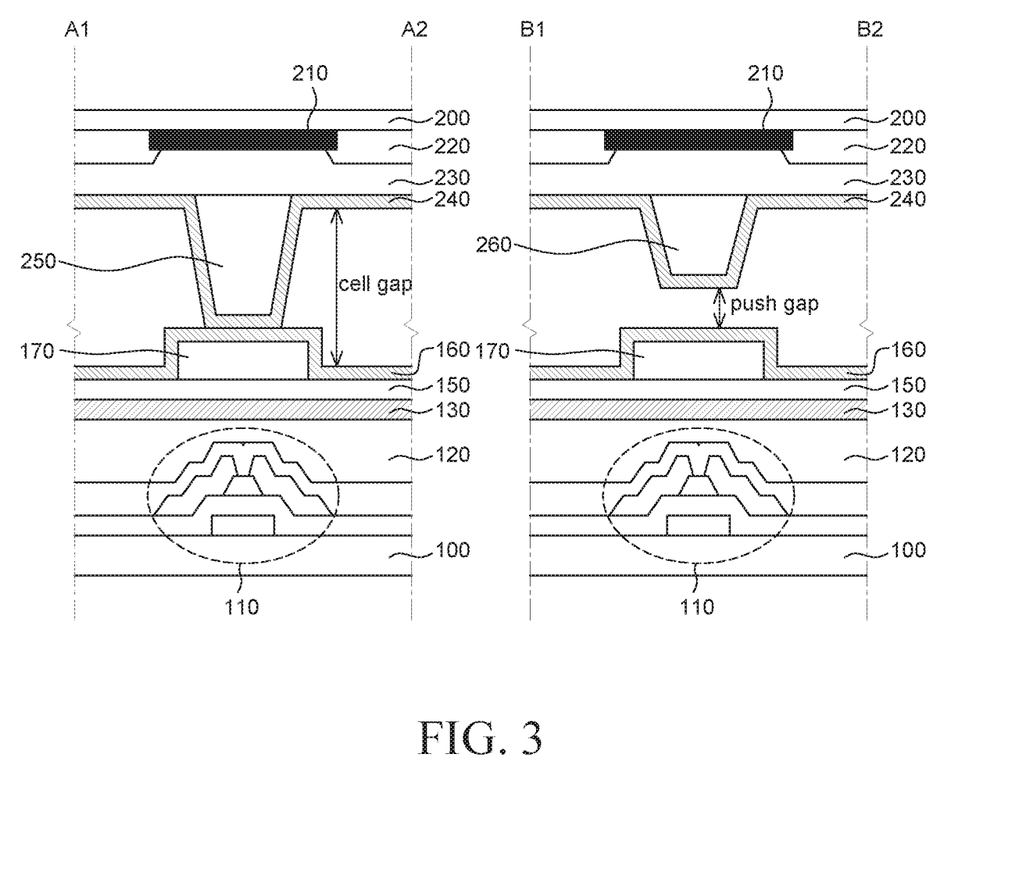
FIG. 3 is cross-sectional views taken along the line A1-A2 and the line B1-B2 of FIG. 2.

FIG. 2 is a plane view illustrating a part of an active area of a liquid crystal display device according to an exemplary embodiment of the present disclosure and FIG. 3 is cross-sectional views taken along the line A1-A2 and the line B1-B2 of FIG. 2.

In FIGS. 2 and 3, some of pixels of the liquid crystal display device and some of a plurality of spacers are illustrated. Referring to FIGS. 2 and 3, the liquid crystal display device includes a first substrate (a TFT array substrate) 100, a second substrate (a color filter substrate) 200 and a liquid crystal layer formed between the first substrate 100 and the second substrate 200. The first substrate 100 may include a thin film transistor 110, a planarization layer 120 and a common electrode 130. The second substrate 200 may include a black matrix 210, a color layer 220, and column spacers 250 and 260. For the convenience of description, only some of components of the liquid crystal display device 10 are illustrated in FIGS. 2 and 3.

The first substrate 100 is a TFT array substrate and may formed of an insulating material such as silicon (Si), glass, plastic, or a polymer film. However, the material for the substrate 100 is not limited to the above-mentioned insulating material, but a material which supports a plurality of layers and elements formed on the substrate 100 may be satisfactorily used. A plurality of pixels (simply referred to as pixels or sub pixels) and elements (a transistor, a capacitor, or the like) which drive the pixels are disposed on the first substrate 100. A pixel area may be defined as an area formed when a gate line GL and a data line DL, which transfer signals to the driving element, intersect each other. An aperture area through which light passes to display an image and a shielding area through which light does not pass are formed on the first substrate 100.

A plurality of pixel areas is defined in the first substrate 100. In each pixel area, at least one thin film transistor (TFT) 110 serving as a switching element is formed. The thin film transistor 110 is disposed corresponding to each sub pixel R, G, or B. The thin film transistor 110 includes a gate electrode, an active layer, a source electrode, and a drain electrode. The active layer between the source electrode and the drain electrode becomes a channel of the thin film transistor 110. The gate electrode, the source electrode, and the drain electrode may be configured by a single layer or a multilayer consisting of a metal material having a low resistive characteristic, for example, aluminum (Al), copper (Cu), molybdenum (Mo), chrome (Cr), gold (Au), titanium (Ti), nickel (Ni), neodymium (Nd), or an alloy thereof. The active layer may be configured by an amorphous silicon layer, a polycrystalline silicon layer obtained by crystallizing amorphous silicon, an oxide semiconductor, an organic semiconductor, or the like.

When the thin film transistor 110 has a staggered structure, the gate electrode is located on the first substrate 100 and the gate electrode may be electrically connected to the gate line. A gate insulating layer covers the gate electrode. The active layer having the channel of the thin film transistor 110 is located on the gate insulating layer. The drain electrode and the source electrode are located on the active layer, the drain electrode may be electrically connected to the data line and the source electrode may be electrically connected to the pixel electrode.

When the thin film transistor 110 has a coplanar structure, the active layer is formed on the substrate. In this case, a buffer layer may be further located between the substrate 100 and the active layer. The buffer layer may protect the thin film transistor from impurities such as alkali ion leaked from the substrate 100. A gate insulating layer may be formed of silicon nitride layer (SiNx), a silicon oxide layer SiO$_2$, or the like and is formed on the active layer. The gate insulating layer may be formed in the active area and a pad area. That is, the gate insulating layer may be formed on an entire surface of the substrate 100 on which the active layer is formed. However, the present disclosure is not limited thereto. The gate electrode is located on the gate insulating layer. The gate electrode may be formed to overlap the active layer in the active area. In the meantime, the gate electrode and the gate line may be formed to be integrated. An inter insulation layer may be formed of a silicon nitride layer or a silicon oxide layer and is located on the gate electrode. The source/drain electrode is formed on the inter insulation layer. In this case, the inter insulation layer may include a plurality of contact holes. The source electrode and the drain electrode are spaced apart from each other with a predetermined interval to be electrically connected to the active layer. More specifically, a semiconductor layer contact hole which exposes the active layer is formed on the gate insulating layer and the inter insulation layer. The source/drain electrode is electrically connected to the active layer through the semiconductor layer contact hole.

The planarization layer 120 is located to cover the thin film transistor 110. The planarization layer 120 flattens an upper portion of the thin film transistor 110. The planarization layer 120 is formed of an organic insulating material having a low permittivity such as photo acrylic material, on the entire surface of the first substrate 100. Such a planarization layer 120 removes an unevenness of the surface of the first substrate 100 caused by the thin film transistor 110.

The common electrode 130 for supplying common voltage Vcom to the pixel is located on the planarization layer 120. The common electrode 130 is an electrode to drive the liquid crystal and is formed in a single pattern in an area excepting an area where a contact hole to be electrically connected to the source electrode of the thin film transistor 110 is formed. The common electrode 130 may be electrically connected to the common line which is disposed in parallel to the gate line, through a separate contact hole. The common electrode 130 may be formed of a transparent conductive material such as indium tin oxide (ITO) or indium zinc oxide (IZO). The common electrode 130 may be formed on an entire surface of the first substrate 100.

A passivation layer 150 covers the common electrode 130. The passivation layer 150 may be formed of an inorganic material such as silicon oxide SiO$_2$, silicon nitride SiNx, or the like. Further, the passivation layer 150 may be formed not only of the inorganic material, but also of an organic material. The passivation layer 150 protects the common electrode 130 and flattens an upper portion of the common electrode 130. The passivation layer 150 may be formed of the same material as the planarization layer 120 or may be formed of a material different from the planarization layer 120.

The pixel electrode is located on the passivation layer 150. The pixel electrode is an electrode to drive the liquid crystal and is formed in each pixel to have a particular shape, such as a rectangle or box. Further, the pixel electrode may be formed on the passivation layer 150 to have a plurality of slits or openings. The pixel electrode is electrically connected to the drain electrode of the thin film transistor 110. The pixel electrode may be formed such that a center thereof is bent or angled at least one time. The pixel electrode and the common electrode 130 may be formed of a transparent conductive material. The common electrode 130 may be located above the pixel electrode or the pixel electrode and the common electrode 130 may be located on the same layer.

A first protruding structure 170 which protrudes toward the color filter substrate 200 is located in an area overlapping the thin film transistor 110 on the passivation layer 150. The first protruding structure may be referred to as a bump spacer (or bump or spacer or the like). The bump spacer 170 has a circular or a bar shaped cross-section. In FIG. 3, the bump spacer 170 having a bar shaped cross-section is disposed in the same direction as a gate line and located over the blue pixel and the red pixel.

A first alignment layer 160 is located on the passivation layer 150 and the bump spacer 170. The first alignment layer 160 may be formed of polyimide (PI) and acts to adjust an orientation of the liquid crystal.

The second substrate 200 is a color filter substrate and is opposite to the first substrate 100. The second substrate 200 may include at least one among a black matrix 210, red (R), green (G), and blue (B) color filters 220, an overcoating layer 230, column spacers 250 and 260, and a second alignment layer 240. The black matrix 210 can be formed to correspond to the shielding area, and the red (R), green (G), and blue (B) color filters 220 are formed to correspond to the aperture area.

The black matrix 210 corresponds to a boundary of the pixel area and may act to suppress light leakage. The black matrix 180 is formed of an opaque material. Such a black matrix 210 may be formed to overlap the thin film transistor 110 formed on the first substrate 100, to minimize the aperture area of the pixel from being reduced. That is, in an area corresponding to the shielding area, various driving elements and wiring lines such as the thin film transistor 110, the data line, and the gate line are located. In an area defined as the aperture area, the pixel electrode and the common electrode are located.

The color filters 220 are formed by selectively applying and removing red, green, and blue color pigments using a mask, and such filters 220 are used to display a color image.

The overcoating layer 230 covers the black matrix 210 and the color filter 220. The overcoating layer 230 is a layer which allows the black matrix 210 and the red, green, and blue color filters 220 to flatten or planarize their upper portions and is formed of an insulating material. The overcoating layer 230 may be formed of the same material as the planarization layer 120.

A step (or some sort of uneven portion) is formed on a surface of the first substrate 100 along a profile of the first protruding structure 170. Second protruding structures 250 and 260 are located above the overcoating layer 230 of the second substrate 200 so as to correspond the first protruding structure (e.g. bump spacer) 170 of the first substrate 100. The second protruding structure may be a column spacer. The column spacer may include a first spacer (e.g. gap spacer) 250 which maintains an interval (i.e. cell gap) between two substrates 100 and 200 and a second spacer (e.g. push spacer) 260 which forms a push interval (e.g. push gap) between the first substrate 100 and the second substrate 200. The first protruding structure and the second protruding structure may be located in an area where the sealant and the substrates 100 and 200 are in contact with each other, which will be described below.

The second alignment layer 240 may covers the second protruding structures 250 and 260. The second alignment layer 240 may be formed of polyimide (PI).

The second protruding structures (e.g. column spacer) may have a circular or bar shaped cross-section. Further, the column spacers 250 and 260 may have tapered appearances. For example, the gap spacer 250 which is in contact with the overcoating layer 230 may have a tapered shape in which a width of an upper end is 16 μm and a width of the lower end is 12 μm.

The upper end and the lower end of the push spacer may be formed to have the same width as the gap spacer. Alternatively, the widths of the upper end and the lower end of the push spacer 260 may be larger or smaller than that of the gap spacer 250. The gap spacer 250 and the push spacer 260 may be simultaneously formed by a single mask process using a half tone mask.

The gap spacer 250 and the push spacer 260 (vertically or in a stacked manner) overlap the bump spacer 170 of the first substrate 100 and the black matrix 210 of the second substrate 200. The surface of the first substrate 100 protrudes along the profile of the bump spacer 170 formed on the first substrate 100. Further, the gap spacer 250 is formed in an area corresponding to the bump spacer 170 to maintain the cell gap between the first substrate 100 and the second substrate 200. In this case, the cell gap between the first substrate 100 and the second substrate 200 may be 3.0 to 3.3 μm. Here, a width of the upper end of the gap spacer 250 may be smaller than a width of the bump spacer 170. That is, the bump spacer 170 may have a width larger than that of the gap spacer 250.

The push spacer 260 is formed to have a lower height than that of the gap spacer 250. The surface of the first substrate 100 protrudes along the profile of the bump spacer 170 formed on the first substrate 100. Further, the push spacer 260 is formed in an area corresponding to the bump spacer 170 so that a push gap is formed between the first substrate 100 and the second substrate 200. In this case, a width of the upper end of the push spacer 260 may be smaller than a width of the bump spacer 170. That is, the bump spacer 170 may have a width larger than that of the push spacer 260.

The gap spacer 250 and the push spacer 260 may be disposed corresponding to the shielding area between the blue pixel and the red pixel. However, the present disclosure is not limited thereto, but the gap spacer 250 and the push spacer 260 may be disposed corresponding to the shielding area between the red pixel and the green pixel.

A particular push gap (for example, 5000 to 6000 Å) may be formed between the push spacer 260 and the bump spacer 170. The push gap may suppress a liquid crystal panel from being broken or damaged when an external force is applied to the second substrate 200.

Even though the gap spacer 250 and the push spacer 260 are allowed to freely move around (e.g. to the left and right) if an external force is applied thereto, the bump spacer 170 does not allow the gap spacer 250 and the push spacer 260 to be in contact with the first alignment 160 in the active area. Therefore, the damage (e.g. the alignment direction of the first alignment 160 being twisted or scratches being formed on the first alignment 160) on the first substrate caused by the undesired contact of the first alignment 160 of the active area and the gap spacer 250 and/or the push spacer 260 may be effectively suppressed. Further, when the push spacer 260 is pushed as a result of the external force, friction is increased by the bump spacer 170 so that the gap spacer 250 and the push spacer 260 may move less.

Figure 4:
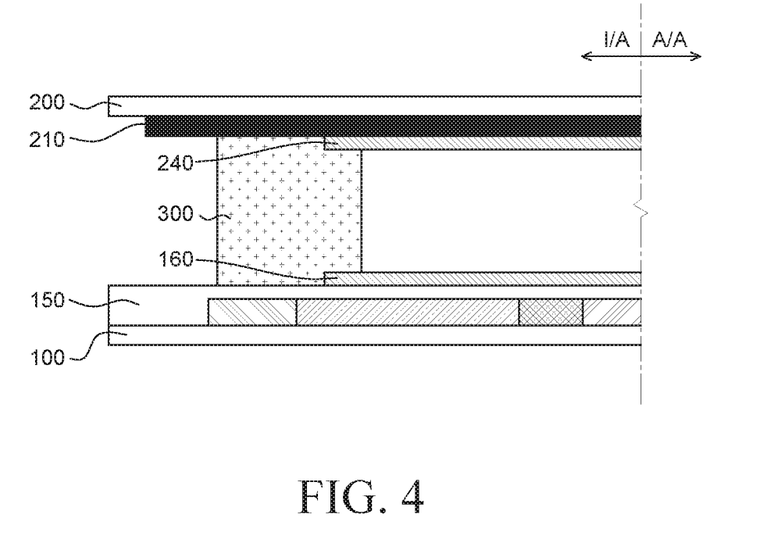
FIG. 4 is a cross-sectional view illustrating a part of an inactive area of a liquid crystal display device.

FIG. 4 is a cross-sectional view illustrating a part of an inactive area of a liquid crystal display device.

The liquid crystal display device 10 may be configured by a first substrate 100 and a second substrate 200. In this case, the first substrate 100 may be a TFT array substrate and the second substrate 200 may be a color filter substrate. A bonding member 300 which bonds the first substrate 100 and the second substrate 200 to each other is provided between the two substrates. The bonding member 300 may enclose the edges of two substrates.

Pixel elements are provided in the active area A/A of the first substrate 100. A color filter which implements colors and a black matrix which suppresses undesirable mixture of colors are provided in the active area of the second substrate 200. Various wiring lines and driving elements are disposed at the outer periphery (i.e. inactive area) of the first substrate and the second substrate.

The bonding member 300 is used to bond two substrates 100 and 200. The bonding member 300 is provided in a seal area. When the seal area is located in the inactive area I/A, a width of the inactive area is reduced, which is advantageous to reduce an overall size of the liquid crystal display device 10. The bonding member 300 may be a sealant that bonds the two substrates 100 and 200 to each other by way of a thermal and/or UV curing process.

In some cases, the alignment layers 160 and 240 are applied on the seal area (i.e. applied to an area where the sealant and the substrates are in contact with each other) over the active area during the manufacturing process of the substrates 100 and 200. In this case, the alignment layers 160 and 240 and the bonding member 300 partially overlap, which may cause the adhesion between the bonding member (for example, sealant) and the substrate to be weakened. Specifically, in a display device to which a narrow bezel is applied, the sealant 300 and the alignment layer 160 may need to overlap to achieve a minimal bezel width.

Therefore, the first protruding structure and the second protruding structure described with reference to FIGS. 2 and 3 may also be located in an area where the bonding member 300 and top surfaces of the substrates 100 and 200 are in contact with each other. The purpose is to reinforce the adhesion between the bonding member 300 and a pair of the substrates 100 and 200 by increasing a surface area where the bonding member 300 and top surfaces of the two substrates 100 and 200 are in contact with each other. Further, the first protruding structure and the second protruding structure also serve as a dam (or some other barrier-like structure) which prevents the alignment layer 260 from flowing into the seal area. Therefore, the lowering of the adhesion between the sealant and the substrate due to the undesired overflow of alignment layer may be suppressed. That is, when the first protruding structure and the second protruding structure are provided, the adhesion between the sealant and the substrate may be further increased as compared with a case that such protruding structure is not provided.

Figure 5:
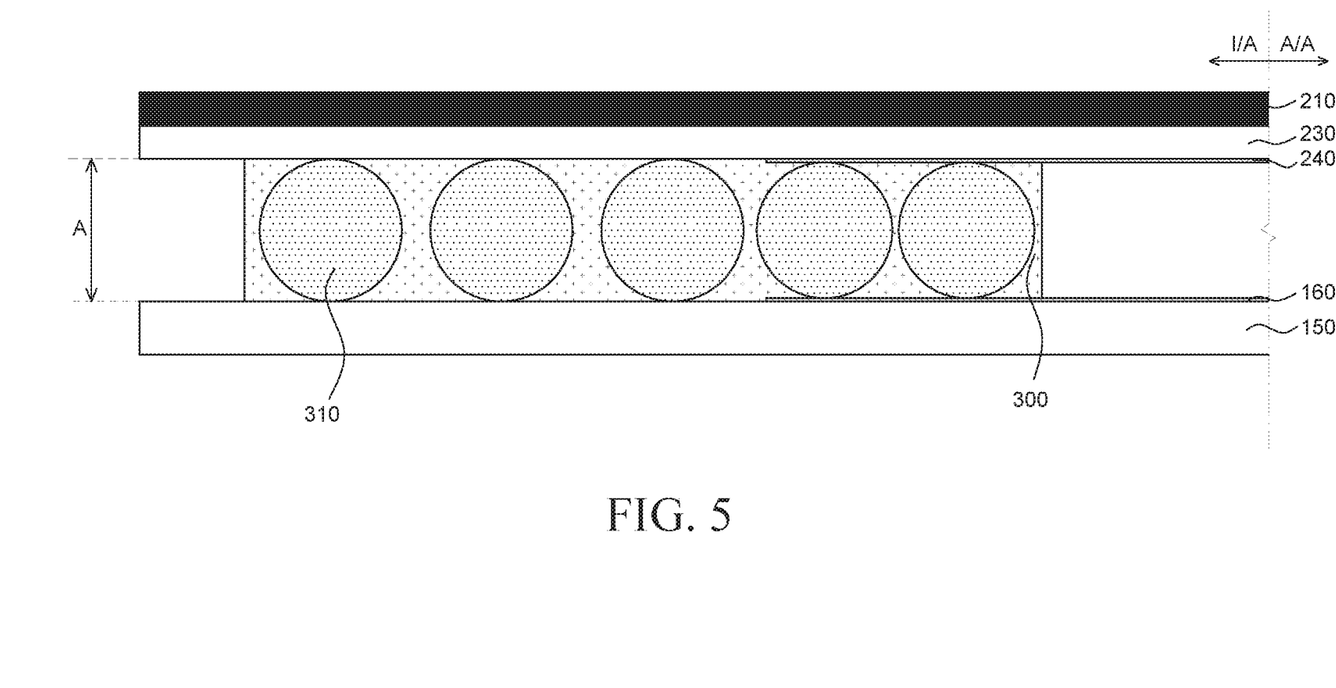
FIG. 5 is a cross-sectional view illustrating a seal area of a liquid crystal display device.

FIG. 5 is a cross-sectional view illustrating a seal area of a liquid crystal display device.

The seal area is an area where a bonding member (for example, a sealant) is applied to bond upper and lower substrates. That is, the seal area is an area where the bonding member and the upper/lower substrates are in contact with each other.

The sealant 300 may include glass fiber 310 to maintain a cell gap. In FIG. 5, a substantially spherical glass fiber is illustrated. The spherical glass fiber 310 may have the substantially the same diameter as the interval between both substrates, that is, a cell gap.

In the illustrated bonding structure, the adhesion between the sealant and the substrate may be weakened, as described above. That is, the adhesion between the sealant and the substrate is weakened due to an organic layer (e.g. alignment layer) which overflows to the seal area. Further, in a display device which employs a design having a narrow bezel, a seal area (in particular, a line width of the sealant) is also reduced, so that the adhesion is highly likely to be lowered.

Figure 6:
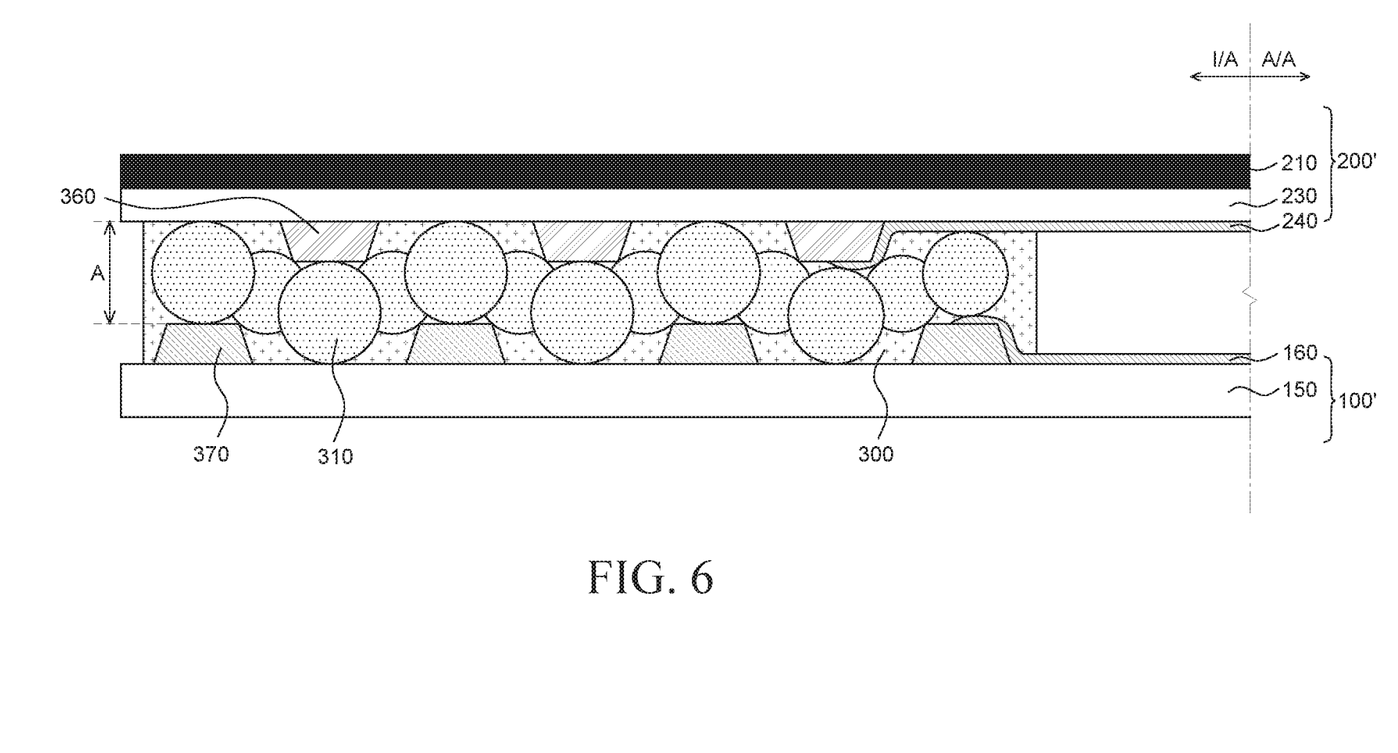
FIG. 6 is a cross-sectional view illustrating a seal area of a liquid crystal display device according to an exemplary embodiment of the present disclosure.

FIG. 6 is a cross-sectional view illustrating a seal area of a liquid crystal display device according to an exemplary embodiment of the present disclosure.

The seal area is located in a part of an inactive area I/A of a display device. The seal area is an area where a bonding member 300 is in contact with upper/lower substrates 100' and 200'. Here, the lower substrate (i.e. first substrate) 100' may refer to an assembly of a supporting substrate and elements disposed on the supporting substrate. Further, the upper substrate (i.e. second substrate) 200' may refer to an assembly of the supporting substrate and elements disposed on the supporting substrate. The first substrate 100' and the second substrate 200' are divided into an active area where pixels are disposed and an inactive area where pixels are not disposed. The pair of substrates 100' and 200' is equipped with structures (e.g. first protruding structure and second protruding structure) which reinforce the adhesion between a bonding member 300 and one of the pair of substrates. The structure may be a plurality of column spacers.

In FIG. 6, even though it is illustrated that a top layer of the first substrate 100' is a passivation layer 150 or an alignment layer 160, the top layer of the first substrate 100' may be a different type of layer therefrom according to an implemented example. Similarly, the top layer of the second substrate 200' may be a different layer from the illustrated overcoating layer 230 or the alignment layer 240.

The first layer 100' is a layer on which elements (e.g. a transistor, a capacitor, or the like) driving pixels are disposed. The first substrate 100' includes a first protruding structure 370 which is located in an area which is in contact with the sealant 300.

The first protruding structure 370 may be the same structure as the first protruding structure (for example, a bump spacer) 170 described with reference to FIGS. 2 and 3. That is, the first protruding structure may be located in both an area where the sealant 300 and the first substrate are in contact with each other and the active area A/A. In this case, the first protruding structure 370 in the area where the sealant 300 and the first substrate are in contact with each other and the first protruding structure 170 in the active area may be manufactured through the same process. That is, the first protruding structure 370 may be simply formed on the first substrate without performing an additional process.

The second substrate 200' is a substrate on which color filters corresponding to pixels are disposed. The second substrate 200' includes a second protruding structure 360 which is located in an area which is in contact with the sealant 300.

The second protruding structure 360 may be the same structure as the second protruding structure (for example, a push spacer) 260 described with reference to FIGS. 2 and 3. That is, the second protruding structure may be located in both an area where the sealant 300 and the second substrate are in contact with each other and the active area A/A. In this case, the second protruding structure 360 in the area where the sealant 300 and the second substrate are in contact with each other and the second protruding structure 260 in the active area may be manufactured through the same process. That is, the second protruding structure 360 may be simply formed on the second substrate without performing an additional process. The second protruding structure 260 may reduce a gap deviation in the sealant. That is, in a part where the cell gap is maintained only by the spherical glass fiber 310, a gap is highly likely to be changed due to an external force, as compared with a part where the cell gap is maintained by the combination of the protruding structures 360 and 370 and the spherical glass fiber 310. Accordingly, when the protruding structures 360 and 370 are more closely disposed, the deviation of the cell gap may be reduced.

The structures (i.e. the first protruding structure and the second protruding structure) increase a surface area where the bonding member 300 and a pair of substrates 100' and 200' are in contact with each other as compared with the case where such structures are not provided. Therefore, the adhesion between the bonding member 300 and the pair of substrates 100' and 200' may be reinforced compared to the situation where such structures are not employed.

The bonding member (for example, a sealant) is located between the first substrate 100' and the second substrate 200' corresponding to the inactive area. In the meantime, the sealant 300 may include a spherical glass fiber 310 which is provided to maintain a cell gap between the first and second substrates, as illustrated in FIG. 6. The spherical glass fibers 310 may have a substantially uniform size. Further, the spherical fibers 310 have a particular elasticity.

The first protruding structure 370 and the second protruding structure 360 have a height determined based on an interval (e.g. cell gap) between the first substrate and the second substrate and a diameter of the glass fiber 310. For example, the first protruding structure 370 and the second protruding structure 360 have a height which is smaller than a difference between a gap between the first substrate and the second substrate and the diameter of the glass fiber. The purpose is to locate the glass fiber 310 between the first protruding structure 370 and the second substrate 200' or the second protruding structure 360 and the first substrate 100'. In this case, the second protruding structure 360 may have a height which is smaller than a difference between the interval (e.g. cell gap) between the first substrate and the second substrate and the height of the first protruding structure 370. That is, the second protruding structure 360 may have the same height as the push spacer 260 which provides a push gap. Differently in the active area, the first protruding structure 370 and the second protruding structure 360 are not (vertically) opposite to each other.

In the meantime, the first protruding structure 370 and the second protruding structure 360 may be spaced apart to have a distance in which the spherical glass fiber is located therebetween. That is, a shortest distance between the first protruding structure 370 and the second protruding structure 360 may be equal to or larger than the diameter of the glass fiber.

The first protruding structure 370 and the second protruding structure 360 may control a range where the alignment layer expands to the outer periphery. That is, as illustrated in FIG. 6, the overflow of the alignment layers 160 and 240 may be suppressed by the first protruding structure 370 and/or the second protruding structure 360 which are located close to the active area.

As described above, the first protruding structure 370 and the second protruding structure 360 increase a surface area in which the bonding member 300 and top surfaces of two substrates are in contact with each other, thereby reinforcing the adhesion between the bonding member 300 and the pair of substrates 100 and 200. Further, the first protruding structure and the second protruding structure also serve as a dam (or barrier) which restrains the alignment layer 260 from flowing into the seal area. Therefore, the lowering of the adhesion between the sealant and the substrate due to the alignment layer may be avoided.

Figure 7:
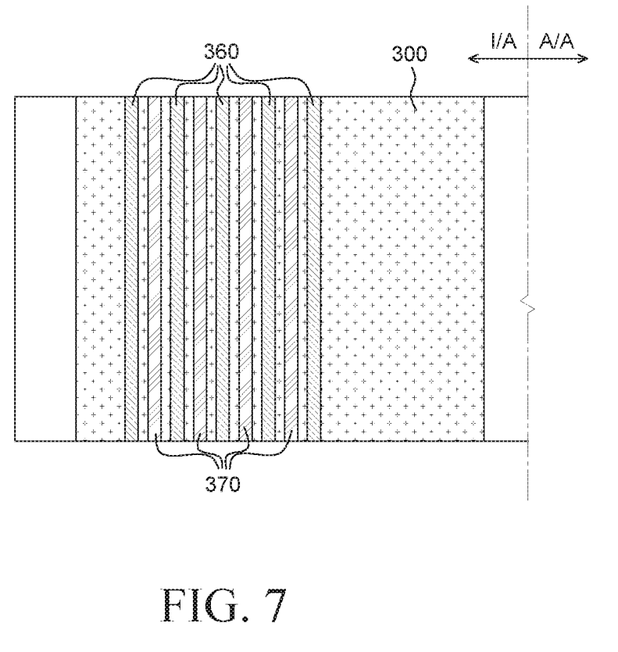
FIG. 7 is a plane view illustrating a seal area of a liquid crystal display device according to an exemplary embodiment of the present disclosure.

FIG. 7 is a plane view illustrating a seal area of a liquid crystal display device according to an exemplary embodiment of the present disclosure; and As described above, in the liquid crystal display device, a first protruding structure 370 and a second protruding structure 360 are located in a seal area. A plane arrangement is illustrated in FIG. 7. That is, the first protruding structure 370 and the second protruding structure 360 may be alternately disposed in a part or all of the seal area.

The first protruding structure 370 and the second protruding structure 360 may be disposed to have various pattern shapes such as a linear shape or an island shape in accordance with a necessary contact surface area.

When the first protruding structure 370 and the second protruding structure 360 are disposed in a part of the seal area, the first protruding structure 370 and the second protruding structure 360 may be located closer to the active area A/A. If necessary, the first protruding structure 370 and the second protruding structure 360 may be disposed to be farther from the active area.

A portion in the entire seal area occupied by the first protruding structure 370 and the second protruding structure 360 may vary depending on a design specification such as a bezel width or a required adhesive strength.

The exemplary embodiments of the present disclosure can also be described as follows:

According to an aspect of the present disclosure, a liquid crystal display device includes: a first substrate having elements configured to driving pixels; a second substrate having color filters corresponding to the pixels; and a sealant configured to bond the first substrate and the second substrate to each other. Herein, the first substrate may include a first protruding structure located in an area in contact with the sealant, and the second substrate may include a second protruding structure located in an area in contact with the sealant.

The first substrate and the second substrate may include an active area where the pixels are disposed and an inactive area surrounding the active area and the sealant may be disposed between the first substrate and the second substrate corresponding to the inactive area.

The sealant may include a spherical glass fiber.

The first protruding structure and the second protruding structure may have heights determined based on an interval or cell gap between the first substrate and the second substrate and a diameter of the glass fiber.

The heights of the first protruding structure may be smaller than a difference between the interval or cell gap between the first substrate and the second substrate and the diameter of the glass fiber.

The heights of the second protruding structure may be smaller than a difference between the interval or cell gap between the first substrate and the second substrate and the height of the first protruding structure.

A shortest distance between the first protruding structure and the second protruding structure may be equal to or larger than a diameter of the glass fiber.

The first protruding structure may be located in an area where the sealant and the first substrate are in contact with each other and the active area and the second protruding structure may be located in an area where the sealant and the second substrate are in contact with each other and the active area.

The first protruding structure located in the area where the sealant and the first substrate are in contact with each other and the first protruding structure located in the active area may be manufactured through the same process.

The second protruding structure located in the area where the sealant and the second substrate are in contact with each other and the second protruding structure located in the active area may be manufactured through the same process.

According to another aspect of the present disclosure, a liquid crystal display device includes: a pair of substrates including an active area where images are displayed and an inactive area adjacent to or surrounding the active area; and a bonding member located between the pair of substrates, enclosing the active area in a partial area of the inactive area, and bonding the pair of substrates to each other. Herein, the pair of substrates may have a structure configured to reinforce an adhesion of the bonding member with respect to the pair of substrates.

The structure may reinforce an adhesion of the bonding member and the pair of substrates by increasing a surface area in which the bonding member and the pair of substrates are in contact with each other as compared with a case in which such structure is not provided.

The bonding member may include a spherical glass fiber configured to maintain a cell gap between the pair of substrates.

A height of the structure may be smaller than a difference between the cell gap and a diameter of the glass fiber.

The structure may be a plurality of column spacers disposed with an interval that is equal to or larger than the diameter of the glass fiber.

According to exemplary embodiments of the present disclosure, a liquid crystal display device with a reinforced adhesion between a substrate and a bonding member is provided. Further, according to exemplary embodiments of the present disclosure, an adhesion between upper and lower substrates may be stably maintained even in a display device which is designed to have a narrow bezel.

It will be apparent to those skilled in the art that various modifications and variations can be made in the liquid crystal display device of the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   a first substrate including an active area and an inactive area, the first substrate comprising:
      a thin-film transistor;
      a planarization layer;
      a common electrode;
      a passivation layer;
      a pixel electrode;
      a first protruding structure on the passivation layer of the inactive area;
      a first active area protruding structure on the passivation layer of the active area; and
      a first alignment layer on the passivation layer and the first active area protruding structure;
   a second substrate facing the first substrate, the second substrate comprising:
      a black matrix;
      color filters;
      an overcoating layer;
      a second protruding structure on the overcoating layer over the first protruding structure;
      a second active area protruding structure on the overcoating layer of the active area; and
      a second alignment layer covering the second active area protruding structure; and
   a sealant configured to bond the first substrate and the second substrate to each other,
   wherein the first and second alignment layers and the sealant partially overlap,
   wherein the first protruding structure is located in an area in contact with the sealant,
   wherein the second protruding structure is located in an area in contact with the sealant,
   wherein the second active area protruding structure comprises:
      a gap holding spacer that contacts with the corresponding first active area protruding structure, and
      a push spacer including a gap between the corresponding first active area protruding structure,
   wherein the second protruding structure has a same height as the push spacer,
   wherein the first active area protruding structure is disposed in a same direction as a gate line, and
   wherein the first active area protruding structure is located over two pixels.

2. The liquid crystal display device according to claim 1, wherein:
   the first substrate and the second substrate include:
      the active area where the pixels are disposed; and
      the inactive area surrounding the active area; and
   the sealant is disposed between the first substrate and the second substrate corresponding to the inactive area.

3. The liquid crystal display device according to claim 2, wherein the sealant includes a spherical glass fiber.

4. The liquid crystal display device according to claim 3, wherein the first protruding structure and the second protruding structure have heights determined based on an interval or cell gap between the first substrate and the second substrate and a diameter of the glass fiber.

5. The liquid crystal display device according to claim 4, wherein the height of the first protruding structure is smaller than a difference between the interval or cell gap between the first substrate and the second substrate and the diameter of the glass fiber.

6. The liquid crystal display device according to claim 5, wherein the height of the second protruding structure is smaller than a difference between the interval or cell gap between the first substrate and the second substrate and the height of the first protruding structure.

7. The liquid crystal display device according to claim 3, wherein a shortest distance between the first protruding structure and the second protruding structure is equal to or larger than a diameter of the glass fiber.

8. The liquid crystal display device according to claim 1, wherein the first protruding structure, located in the area where the sealant and the first substrate are in contact with each other, and the first protruding structure, located in the active area, are manufactured through the same process.

9. The liquid crystal display device according to claim 1, wherein the second protruding structure located, in the area where the sealant and the second substrate are in contact with each other, and the second protruding structure, located in the active area, are manufactured through the same process.

10. A liquid crystal display device, comprising:
    a pair of first and second substrates including:
       an active area where images are displayed; and
       an inactive area adjacent to or surrounding the active area; and
    a bonding member located between the pair of substrates, the bonding member enclosing the active area in a partial area of the inactive area and bonding the pair of substrates to each other,
    wherein the pair of substrates has a structure configured to reinforce an adhesion of the bonding member with respect to the pair of substrates, and
    wherein the structure comprises:
       a first protruding portion disposed on a passivation layer of the inactive area and in an area in contact with the bonding member, the first protruding portion including a first alignment layer directly thereon, the first alignment layer being on a side of the first protruding portion facing the first substrate,
       a first active area protruding structure disposed on a passivation layer of the active area of the first substrate,
       a second protruding portion disposed on a overcoating layer over the first protruding structure and in an area in contact with the bonding member, the second protruding portion including a second alignment layer directly thereon, the second alignment layer being on a side of the second protruding portion facing the second substrate, and
       a second active area protruding structure on the overcoating layer of the active area of the second substrate, and
    wherein the first and second alignment layers and the bonding member partially overlap,
    wherein the second active area protruding structure comprises:
       a gap holding spacer that contacts the corresponding first active area protruding structure, and
       a push spacer including a gap between the corresponding first active area protruding structure, wherein the second protruding structure has a same height as the push spacer, wherein the first active area protruding structure is disposed in a same direction as a gate line, and wherein the first active area protruding structure is located over two pixels.

11. The liquid crystal display device according to claim 10, wherein the structure reinforces an adhesion of the bonding member and the pair of the first and second substrates by increasing a surface area in which the bonding member and the pair of the first and second substrates are in contact with each other as compared with a case in which such structure is not provided.

12. The liquid crystal display device according to claim 10, wherein the bonding member includes a spherical glass fiber configured to maintain a cell gap between the pair of the first and second substrates.

13. The liquid crystal display device according to claim 12, wherein a height of the structure is smaller than a difference between the cell gap and a diameter of the glass fiber.

14. The liquid crystal display device according to claim 13, wherein the structure is a plurality of column spacers disposed with an interval that is equal to or larger than the diameter of the glass fiber.

15. The liquid crystal display device according to claim 1, wherein:

the first substrate further includes a third protruding structure in contact with the sealant, the third protruding structure including the first alignment layer directly thereon; and the second substrate further includes a fourth protruding structure in contact with the sealant, the fourth protruding structure including the second alignment layer directly thereon, the fourth protruding structure being on a side of the second protruding structure facing the first substrate, the second alignment layer being spaced apart from the first alignment layer with the sealant therebetween at an area in which the third and fourth protruding structures are closest.

16. The liquid crystal display device according to claim 10, wherein:

the second substrate further includes a third protruding portion in contact with the bonding member, the third protruding portion including the first alignment layer directly thereon; and the first substrate further includes a fourth protruding portion in contact with the bonding member, the fourth protruding portion including the second alignment layer directly thereon, the fourth alignment layer being on a side of the second protruding portion facing the first substrate, the second alignment layer being spaced apart from the first alignment layer with the bonding member therebetween at an area in which the third and fourth protruding portions are closest.

17. The liquid crystal display device according to claim 1, wherein:

the first protruding structure does not directly contact the overcoating layer; and the second protruding structure does not directly contact the passivation layer.

* * * * *